(12) United States Patent
Sakai et al.

(10) Patent No.: US 10,907,708 B2
(45) Date of Patent: Feb. 2, 2021

(54) DEVICE OPERATING STRUCTURE AND DEVICE

(71) Applicant: SHARP KABUSHIKI KAISHA, Osaka (JP)

(72) Inventors: Shogo Sakai, Sakai (JP); Atsuki Oi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 122 days.

(21) Appl. No.: 16/344,660

(22) PCT Filed: Aug. 29, 2017

(86) PCT No.: PCT/JP2017/031014
§ 371 (c)(1),
(2) Date: Apr. 24, 2019

(87) PCT Pub. No.: WO2018/079058
PCT Pub. Date: May 3, 2018

(65) Prior Publication Data
US 2020/0056683 A1 Feb. 20, 2020

(30) Foreign Application Priority Data
Oct. 28, 2016 (JP) ................. 2016-212326

(51) Int. Cl.
*F16H 21/14* (2006.01)
*B25J 17/00* (2006.01)

(52) U.S. Cl.
CPC ............. *F16H 21/14* (2013.01); *B25J 17/00* (2013.01)

(58) Field of Classification Search
CPC .......... F16H 21/14; F16H 21/12; F16H 21/48; F16H 19/08; B25J 17/00; A63H 3/20; A63H 11/00; A63H 11/18; A63H 13/00; F16M 11/18; F16M 11/2035; F16M 11/2042; F16M 11/2078; Y10T 74/1529; Y10T 74/18024; Y10T 74/18032; Y10T 74/18064; Y10T 74/18256; Y10T 74/18408
See application file for complete search history.

(56) References Cited

U.S. PATENT DOCUMENTS 3,862,513 A * 1/1975 Isaacson ................... A63H 3/20
446/381
4,699,603 A * 10/1987 Saigo ................... A63H 13/005
446/304

(Continued)

FOREIGN PATENT DOCUMENTS

JP 2013091145 A * 5/2013
JP 2013205518 A * 10/2013
WO 2012/160659 A1 11/2012

*Primary Examiner* — Daniel D Yabut
(74) *Attorney, Agent, or Firm* — ScienBiziP, P.C.

(57) ABSTRACT

An embodiment of the present invention achieves a reduction in size of a movable structure for a device. A right link (6) is fixed to a rotary shaft (51) of a right motor (5). The right link (6) has a tip (61) which can slide in a sliding region (31). A portion of the tip (61) which can make contact with a connecting part (3) has a spherical shape. A left link (8) is fixed to a rotary shaft (71) of a left motor (7). The left link (8) has a tip (81) which can slide in a sliding region (32). A portion of the tip (81) which can make contact with the connecting part (3) has a spherical shape.

6 Claims, 4 Drawing Sheets

(56) References Cited

U.S. PATENT DOCUMENTS

| | | | | |
|---|---|---|---|---|
| 6,093,078 A * | 7/2000 | Cook | ............... | A63H 7/06 |
| | | | | 446/330 |
| 7,096,983 B2 * | 8/2006 | Hirai | ............... | B25J 18/00 |
| | | | | 180/8.1 |
| 7,278,501 B2 * | 10/2007 | Mori | ............... | B25J 9/1641 |
| | | | | 180/8.5 |
| 2005/0021180 A1 * | 1/2005 | Kwon | ............... | A63H 11/00 |
| | | | | 700/245 |
| 2008/0026669 A1 * | 1/2008 | Rehkemper | ............... | A63H 13/00 |
| | | | | 446/301 |
| 2009/0118865 A1 * | 5/2009 | Egawa | ............... | B25J 19/023 |
| | | | | 700/259 |
| 2014/0060224 A1 | 3/2014 | Amino et al. | | |

* cited by examiner

DEVICE OPERATING STRUCTURE AND DEVICE

TECHNICAL FIELD

The present invention relates to (i) a movable structure for a device and (ii) a device.

BACKGROUND ART

Patent Literature 1 discloses a head part structure for a robot, the structure including a first motor, a second motor, a first elastic beam member, and a second elastic beam member. The first and second motors are supported beside one another in the robot head part such that the respective output shafts thereof are aligned along the same axis. The first elastic beam member is driven by the first motor. A first end of the first elastic beam member is attached to the output shaft of the first motor so as to be rotatable around the output shaft. A second end of the first elastic beam member, which extends from the output shaft in a vertical direction, is supported in a trunk part of the robot. The second elastic beam member is driven by the second motor. A first end of the second elastic beam member is attached to the output shaft of the second motor so as to be rotatable around the output shaft. A second end of the second elastic beam member, which extends from the output shaft and alongside the first elastic beam member, is supported in the trunk part of the robot.

CITATION LIST

Patent Literature

[Patent Literature 1]
International Publication No. WO 2012/160659 (Publication Date: Nov. 29, 2012)

SUMMARY OF INVENTION

Technical Problem

The head part structure of Patent Literature 1 is configured such that in order to achieve movement in two axial directions (i.e., left-to-right turning of the head and nodding of the head), it is necessary to twist the first and second elastic beam members. In order to achieve a sufficiently large angle of head turning, it is necessary to employ first and second elastic beam members which have long total lengths so as to increase the angle of twisting. This serves as an impediment to reducing the size of the head part structure of Patent Literature 1.

This problem can affect not only robot head part structures, but also a variety of movable structures having movable parts.

An object of an aspect of the present invention is to achieve a reduction in the size of a movable structure for a device.

Solution to Problem

In order to solve the above problem, a movable structure for a device in accordance with an aspect of the present invention includes: a movable part; a connecting part which has a first region and a second region and is connected to a housing; a first motor which is fixed to the movable part and has a first rotary shaft; a second motor which is fixed to the movable part and has a second rotary shaft; a first link which has a first tip and is fixed to the first rotary shaft, the first tip being in contact with the connecting part in a manner so as to be able to slide in the first region, a portion of the first tip which can make contact with the connecting part having a spherical shape; and a second link which has a second tip and is fixed to the second rotary shaft, the second tip being in contact with the connecting part in a manner so as to be able to slide in the second region, a portion of the second tip which can make contact with the second region having a spherical shape.

Advantageous Effects of Invention

An aspect of the present invention makes it possible to achieve a reduction in the size of a movable structure for a device.

DESCRIPTION OF EMBODIMENTS

Embodiment 1

The following description will discuss, in detail, an embodiment of the present invention.

Figure 1:
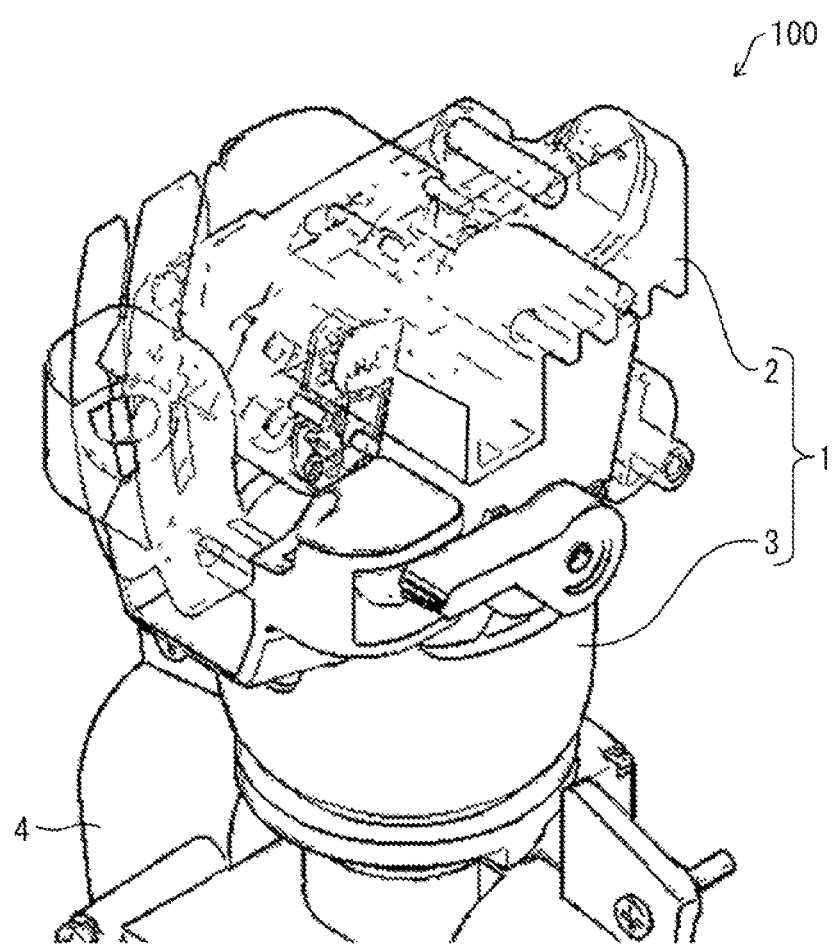
FIG. 1 is a diagram illustrating a configuration of a part of a robot in accordance with Embodiment 1 of the present invention.

FIG. 1 is a diagram illustrating a configuration of a part of a robot 100 (device) in accordance with Embodiment 1 of the present invention. The robot 100 includes at least a head part structure 1 (movable structure) and a trunk 4 (housing). The head part structure 1 includes at least a head part 2 (movable part) and a connecting part 3. The connecting part 3 is connected to the trunk 4. In addition to the head part structure 1 and the trunk 4, the robot 100 also includes other parts which are not illustrated, such as arm parts and leg parts. The robot 100 is, for example, in the form of a humanoid robot capable of autonomous walking.

The robot 100 further includes a link (not illustrated) for indirectly connecting the head part 2 to the connecting part 3. A first end of this link is connected to the trunk 4, and a second end of the link is connected to the connecting part 3. The head part 2 does not make contact with the trunk 4. The connecting part 3 is connected to the trunk 4 in a manner such that the positions of the trunk 4 and the connecting part 3 can be changed with respect to each other. Specifically, the connecting part 3 is provided above the trunk 4 in a manner such that the entire head part 2 can turn leftward/rightward.

Details of Head Part Structure 1

Figure 2:
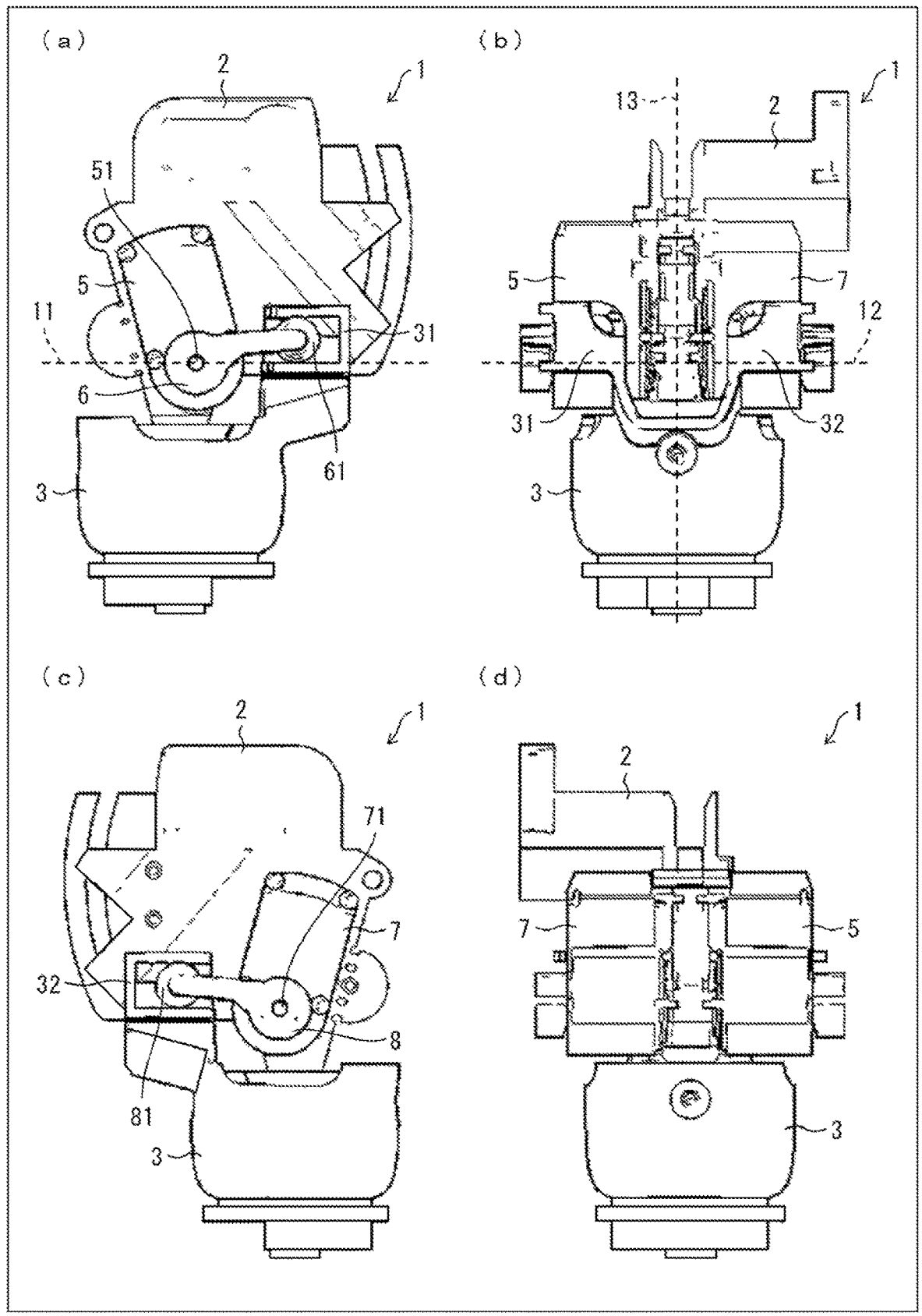
FIG. 2 is a diagram illustrating in detail a configuration of a head part structure.

FIG. 2 is a diagram illustrating in detail a configuration of the head part structure 1. (a) of FIG. 2 illustrates the head part structure 1 as viewed from the right side of the robot 100. (b) of FIG. 2 illustrates the head part structure 1 as viewed from the front of the robot 100. (c) of FIG. 2 illustrates the head part structure 1 as viewed from the left side of the robot 100. (d) of FIG. 2 illustrates the head part structure 1 as viewed from the rear of the robot 100.

As illustrated in FIG. 2, the head part structure 1 further includes a right motor 5 (first motor), a right link 6 (first link), a left motor 7 (second motor), and a left link 8 (second link). The right motor 5 has a rotary shaft 51 (first rotary shaft). The right link 6 has a tip 61 (first tip). The left motor 7 has a rotary shaft 71 (second rotary shaft). The left link 8 has a tip 81 (second tip).

The connecting part 3 has a sliding region 31 (first region) and a sliding region 32 (second region). The sliding region 31 is positioned at a portion of the connecting part 3 which portion is toward a right side of the robot 100. The sliding region 31 is a region having a certain range in which the tip 61 of the right link 6 slides. The sliding region 32 is positioned at a portion of the connecting part 3 which portion is toward a left side of the robot 100. The sliding region 32 is a region having a certain range in which the tip 81 of the left link 8 slides. In Embodiment 1, the sliding region 31 and the sliding region 32 are equal in size.

The right motor 5 is fixed to a portion of the head part 2 which portion is toward a right side of the robot 100. The right motor 5 is fixed to the head part 2 at a position which is closer to the rear of the robot 100 than is the sliding region 31. When the right motor 5 is fixed, the rotary shaft 51 is positioned so as to be below the head part 2. When the right motor 5 operates, the rotary shaft 51 rotates.

An end of the right link 6 which is opposite from the tip 61 is fixed to the rotary shaft 51. The tip 61 is in contact with the connecting part 3 in a manner so as to be able to slide in the sliding region 31. The sliding region 31 covers upper and lower portions of the tip 61. A portion of the tip 61 which can make contact with the sliding region 31 has a spherical shape. The tip 61 may be spherically shaped in its entirety, including portions of the tip 61 which do not make contact with the sliding region 31.

The left motor 7 is fixed to a portion of the head part 2 which portion is toward a left side of the robot 100. The left motor 7 is fixed to the head part 2 at a position which is closer to the rear of the robot 100 than is the sliding region 32. When the left motor 7 is fixed, the rotary shaft 71 is positioned so as to be below the head part 2. When the left motor 7 operates, the rotary shaft 71 rotates.

An end of the left link 8 which is opposite from the tip 81 is fixed to the rotary shaft 71. The tip 81 is in contact with the connecting part 3 in a manner so as to be able to slide in the sliding region 32. The sliding region 32 covers upper and lower portions of the tip 81. A portion of the tip 81 which can make contact with the sliding region 32 has a spherical shape. The tip 81 may be spherically shaped in its entirety, including portions of the tip 81 which do not make contact with the sliding region 32.

As the rotary shaft 51 rotates, motive power of the right motor 5 is transmitted to the right link 6. As a result, the tip 61 of the right link 6 slides in the sliding region 31. As the rotary shaft 71 rotates, motive power of the left motor 7 is transmitted to the left link 8. As a result, the tip 81 of the left link 8 slides in the sliding region 32. The robot 100 is configured such that the right motor 5 and the left motor 7 can be operated separately from each other. As such, the robot 100 is configured such that the tip 61 of the right link 6 and the tip 81 of the left link 8 can slide separately from each other.

The head part structure 1 has a roll axis 11, a pitch axis 12, and a yaw axis 13. As described later, the robot 100 is configured so as to be able to rotate the head part 2 around the roll axis 11. The robot 100 is also configured so as to be able to rotate the head part 2 around the pitch axis 12.

The right motor 5 and the left motor 7 are provided in a line, so as to be aligned along the same axis. More specifically, the rotary shaft 51 and the rotary shaft 71 are provided so as to be aligned along the same axis. In the example illustrated in FIG. 2, this same axis is the pitch axis 12. This example is non-limiting, however; the same axis may be any axis parallel to the pitch axis 12.

The right motor 5 and the left motor 7 are equal to each other in shape and size. The right link 6 and the left link 8 are equal to each other in shape and size. The tip 61 and the tip 81 are equal to each other in shape and size. The right motor 5 and the left motor 7 are provided in a manner so as to be symmetrical with respect to a plane which (i) is orthogonal to the pitch axis 12 and (ii) includes both the roll axis 11 and the yaw axis 13. The same applies to the right link 6 and the left link 8. The same applies to the sliding region 31 and the sliding region 32.

Nodding of Head Part 2

Figure 3:
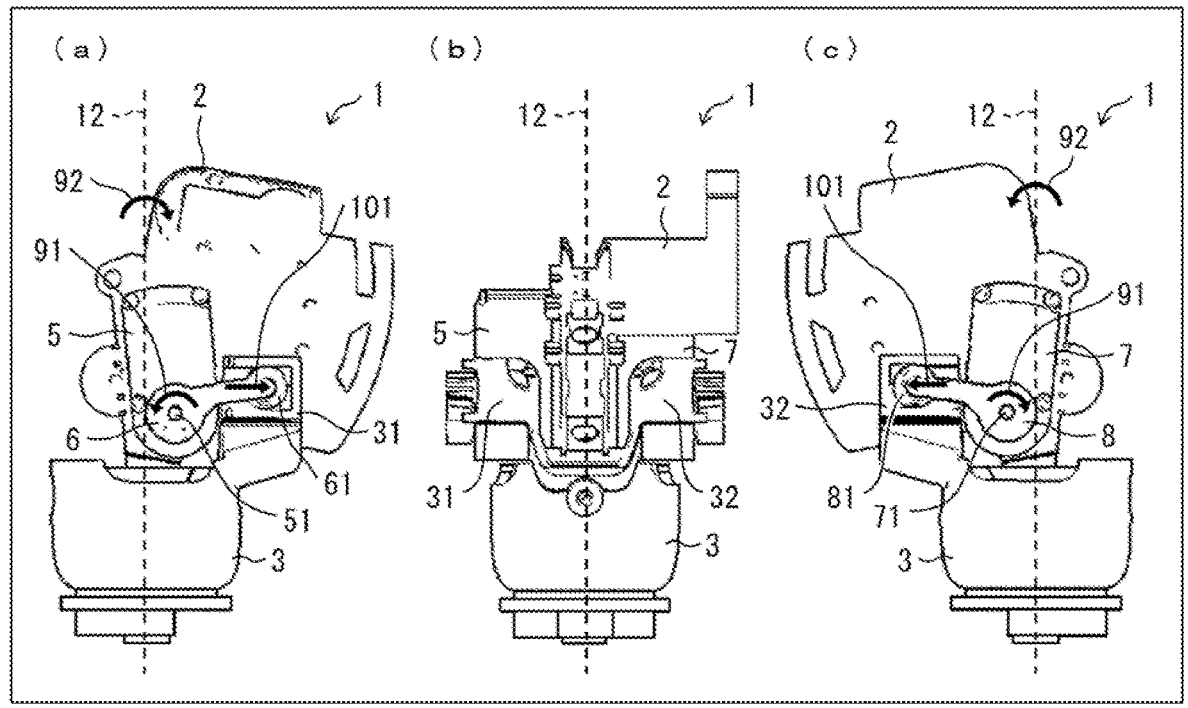
FIG. 3 is a diagram for explaining nodding of a head part.

FIG. 3 is a diagram for explaining nodding of the head part 2. (a) of FIG. 3 illustrates the head part structure 1 as viewed from the right side of the robot 100. (b) of FIG. 3 illustrates the head part structure 1 as viewed from the front of the robot 100. (c) of FIG. 3 illustrates the head part structure 1 as viewed from the left side of the robot 100.

The robot 100 rotates the rotary shaft 51 of the right motor 5 and the rotary shaft 71 of the left motor 7 in the same direction, which is a first rotation direction. Specifically, the rotary shaft 51 and the rotary shaft 71 are both rotated in a rearward rotation direction 91 of the robot 100. The rearward rotation direction 91 is a rotation direction from the front of the robot 100 to the rear of the robot 100. As the rotary shaft 51 rotates in the rearward rotation direction 91, the tip 61 of the right link 6 slides, in the sliding region 31, in a frontward direction 101 of the robot 100. The frontward direction 101 is a linear direction from the rear of the robot 100 to the front of the robot 100. As the rotary shaft 71 rotates in the rearward rotation direction 91, the tip 81 of the left link 8 slides, in the sliding region 32, in the frontward direction 101 of the robot 100. This sliding causes a change in the positional relationship between (i) the connecting part 3 and (ii) the right link 6 and left link 8.

Because the end of the right link 6 is fixed to the rotary shaft 51 of the right motor 5, a change in the position of the right link 6 is accompanied by a change in the position of the right motor 5. Because the end of the left link 8 is fixed to the rotary shaft 71 of the left motor 7, a change in the position of the left link 8 is accompanied by a change in the position of the left motor 7. Because the right motor 5 and the left motor 7 are fixed to the head part 2, a change in the positions of the right motor 5 and the left motor 7 results in a change in the position of the head part 2.

As illustrated in FIG. 3, as the tip 61 and the tip 81 slide in the frontward direction 101, the head part 2 rotates in a frontward rotation direction 92. The frontward rotation direction 92 is a rotation direction from the rear of the robot 100 to the front of the robot 100. In this way, the robot 100 is able to nod the head part 2 toward the front of the robot 100.

Rearward Tilting of Head Part 2

Figure 4:
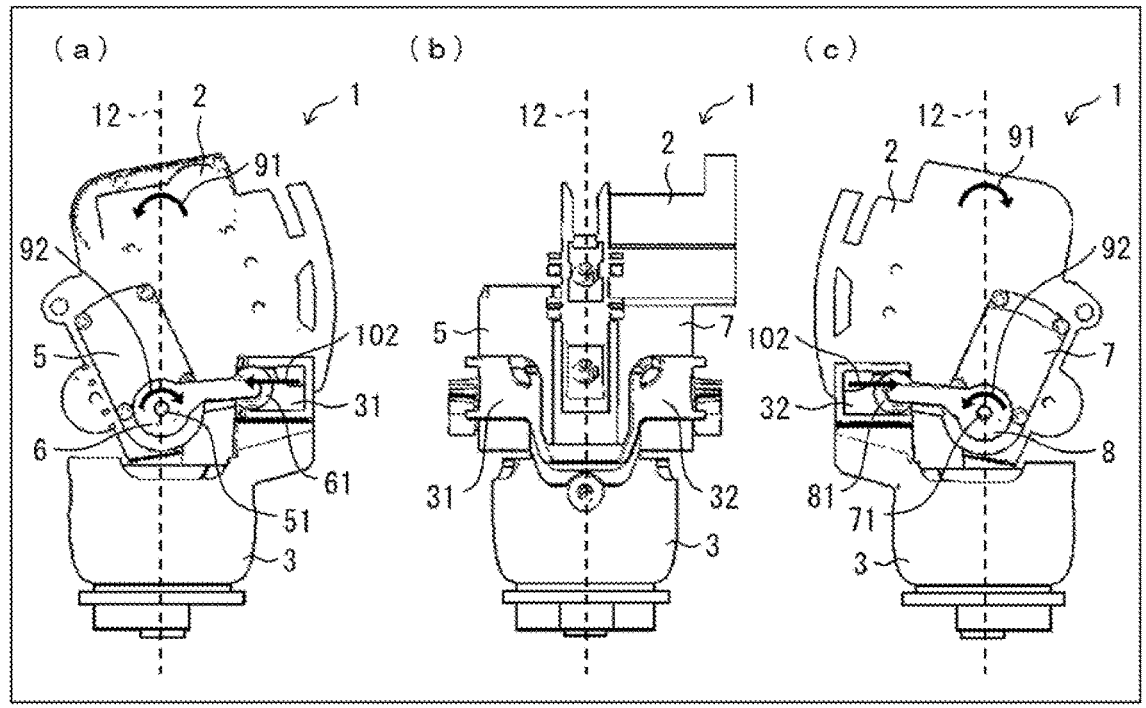
FIG. 4 is a diagram for explaining rearward tilting of the head part.

FIG. 4 is a diagram for explaining rearward tilting of the head part 2. (a) of FIG. 4 illustrates the head part structure 1 as viewed from the right side of the robot 100. (b) of FIG. 4 illustrates the head part structure 1 as viewed from the front of the robot 100. (c) of FIG. 4 illustrates the head part structure 1 as viewed from the left side of the robot 100.

The robot 100 rotates the rotary shaft 51 of the right motor 5 and the rotary shaft 71 of the left motor 7 in a second rotation direction, which is reverse with respect to the first rotation direction. Specifically, the rotary shaft 51 and the rotary shaft 71 are both rotated in the frontward rotation direction 92 of the robot 100. This causes the tip 61 of the right link 6 to slide, in the sliding region 31, in a rearward direction 102 of the robot 100. The rearward direction 102 is a linear direction from the front of the robot 100 to the rear of the robot 100. The tip 81 of the left link 8 similarly slides, in the sliding region 32, in the rearward direction 102 of the robot 100.

In the example illustrated in FIG. 4, as the tip 61 and the tip 81 slide in the rearward direction 102, the head part 2 rotates in the rearward rotation direction 91. The robot 100 is therefore able to tilt the head part 2 toward the rear of the robot 100.

Rightward Tilting of Head Part 2

Figure 5:
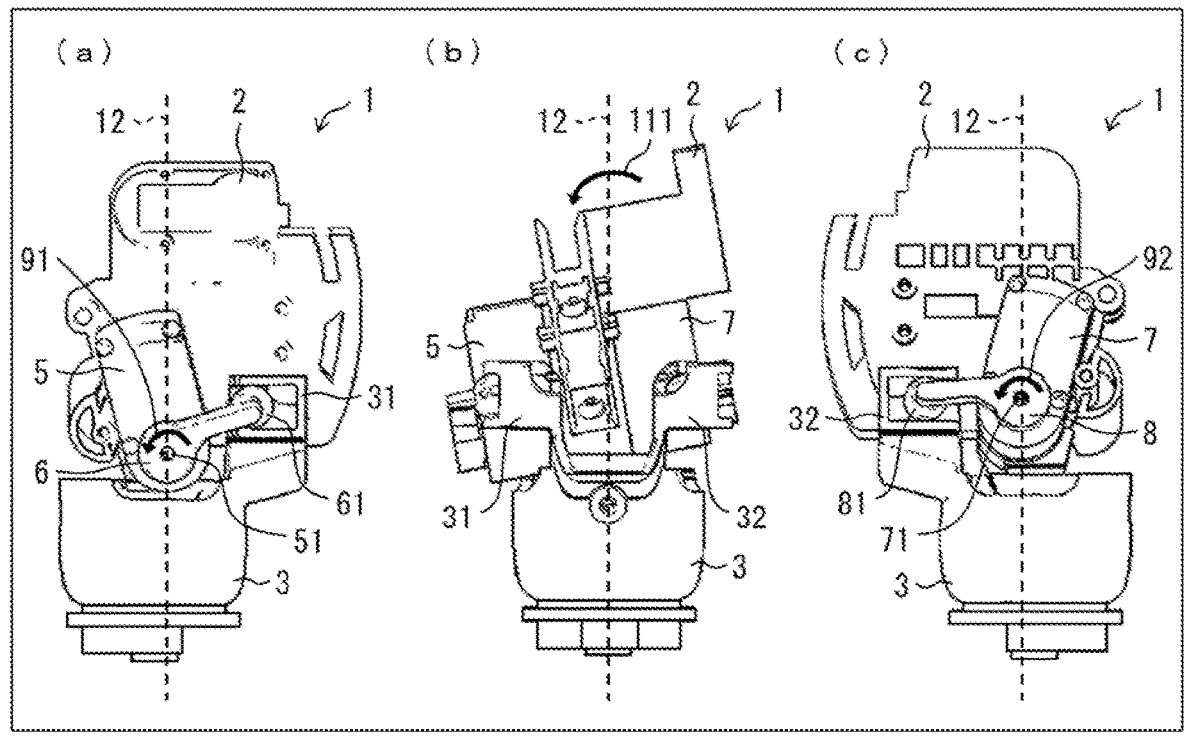
FIG. 5 is a diagram for explaining rightward tilting of the head part.

FIG. 5 is a diagram for explaining rightward tilting of the head part 2. (a) of FIG. 5 illustrates the head part structure 1 as viewed from the right side of the robot 100. (b) of FIG. 5 illustrates the head part structure 1 as viewed from the front of the robot 100. (c) of FIG. 5 illustrates the head part structure 1 as viewed from the left side of the robot 100.

The robot 100 rotates the rotary shaft 51 of the right motor 5 and the rotary shaft 71 in left motor 7 in respective opposite directions. Specifically, the rotary shaft 51 is rotated in the rearward rotation direction 91, and the rotary shaft 71 is rotated in the frontward rotation direction 92. This causes a force to be applied to the head part 2, with the link (not illustrated) that connects the head part 2 and the connecting part 3 acting as a fulcrum, so as to rotate the head part 2 in a rightward rotation direction 111 of the robot 100. The force is applied from (i) the end of the right link 6 which is fixed to the rotary shaft 51 of the right motor 5 and (ii) the end of the left link 8 which is fixed to the rotary shaft 71 of the left motor 7.

As described above, a portion of the tip 61 of the right link 6 which can make contact with the sliding region 31 has a spherical shape. As such, when the force that causes the head part 2 to rotate in the rightward rotation direction 111 is applied to the head part 2, it is possible for the tip 61 to smoothly rotate in the rightward rotation direction 111 while being in contact with the sliding region 31.

As described above, a portion of the tip 81 of the left link 8 which can make contact with the tip 81 has a spherical shape. As such, when the force that causes the head part 2 to rotate in the rightward rotation direction 111 is applied to the head part 2, it is possible for the tip 81 to smoothly rotate in the rightward rotation direction 111 while being in contact with the sliding region 32.

In the example illustrated in FIG. 5, rotation of both the tip 61 and the tip 81 in the rightward rotation direction 111 causes the head part 2 to rotate in the rightward rotation direction 111. In this way, the robot 100 is able to tilt the head part 2 toward the right side.

Leftward Tilting of Head Part 2

Figure 6:
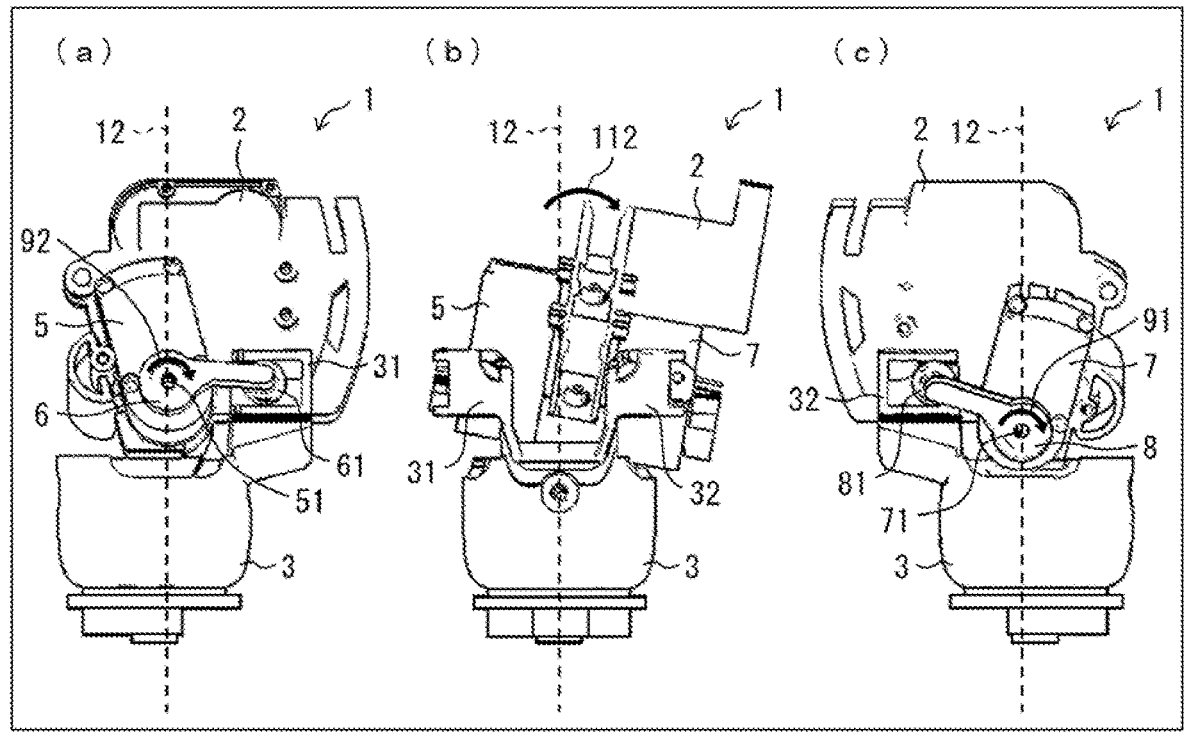
FIG. 6 is a diagram for explaining leftward tilting of the head part.

FIG. 6 is a diagram for explaining leftward tilting of the head part 2. (a) of FIG. 6 illustrates the head part structure 1 as viewed from the right side of the robot 100. (b) of FIG. 6 illustrates the head part structure 1 as viewed from the front of the robot 100. (c) of FIG. 6 illustrates the head part structure 1 as viewed from the left side of the robot 100.

The robot 100 rotates the rotary shaft 51 of the right motor 5 and the rotary shaft 71 in left motor 7 in respective opposite directions. Specifically, the rotary shaft 51 is rotated in the frontward rotation direction 92, and the rotary shaft 71 is rotated in the rearward rotation direction 91. This causes a force to be applied to the head part 2, with the link (not illustrated) that connects the head part 2 and the connecting part 3 acting as a fulcrum, so as to rotate the head part 2 in a leftward rotation direction 112 of the robot 100. The force is applied from (i) the end of the right link 6 which is fixed to the rotary shaft 51 of the right motor 5 and (ii) the end of the left link 8 which is fixed to the rotary shaft 71 of the left motor 7.

The portion of the tip 61 of the right link 6 which can make contact with the sliding region 31 has a spherical shape. As such, when the force that causes the head part 2 to rotate in the leftward rotation direction 112 is applied to the head part 2, it is possible for the tip 61 to smoothly rotate in the leftward rotation direction 112 while being in contact with the sliding region 31. The portion of the tip 81 of the left link 8 which can make contact with the sliding region 32 has a spherical shape. As such, when the force that causes the head part 2 to rotate in the leftward rotation direction 112 is applied to the head part 2, it is possible for the tip 81 to smoothly rotate in the leftward rotation direction 112 while being in contact with the sliding region 32.

In the example illustrated in FIG. 6, rotation of both the tip 61 and the tip 81 in the leftward rotation direction 112 causes the head part 2 to rotate in the leftward rotation direction 112. In this way, the robot 100 is able to tilt the head part 2 toward the left side of the robot 100.

Advantages of Embodiment 1

Embodiment 1 brings about, for example, the following advantages.

1. The robot 100 is configured such that rotating the head part 2 in any of two differing axial directions does not require twisting the right link 6 and the left link 8. It is therefore possible to decrease the total lengths of both the right link 6 and the left link 8. As a result, it is possible to achieve a reduction in size of the head part structure 1 which includes the right link 6 and the left link 8. This further makes it possible to realize a robot 100 having a head part structure 1 which is reduced in size.

2. Because the rotary shaft 51 and the rotary shaft 71 are provided so as to be aligned along the same axis (for example, the pitch axis 12), it is possible to further decrease the total lengths of both the right link 6 and the left link 8. This makes it possible to further save space inside the head part structure 1.

3. The right motor 5 and the left motor 7 are provided in a manner so as to be symmetrical with respect to a plane which (i) is orthogonal to the pitch axis 12 and (ii) includes both the roll axis 11 and the yaw axis 13. As such, the robot 100 can rotate the head part 2 in any of two axial directions to a degree which corresponds to the rotation of the right motor 5 and the left motor 7.

4. The sliding region 31 covers the upper and lower portions of the tip 61, and the sliding region 32 covers the upper and lower portions of the tip 81. As such, when the right link 6 and the left link 8 slide, motive power is efficiently transmitted from the right motor 5 and the left motor 7 to the connecting part 3.

5. A surface of the sliding region 31 which makes contact with the tip 61 is flat. This allows the tip 61 to slide smoothly in the sliding region 31. Similarly, a surface of the sliding region 32 which makes contact with the tip 81 is flat. This allows the tip 81 to slide smoothly in the sliding region 31. It is therefore possible to rotate the head part 2 smoothly.

Embodiment 2

The following description will discuss another embodiment of the present invention. For convenience of explanation, the same reference numerals are given to members having functions identical with those described in the above embodiment, and descriptions of such members are omitted.

In Embodiment 2, the right motor 5 and the left motor 7 are provided so as not to be aligned along the same axis. In other words, the rotary shaft 51 of the right motor 5 and the rotary shaft 71 of the left motor 7 are aligned along differing respective axes. Even with such a configuration, the robot 100 is able to achieve nodding of the head part 2 and tilting of the head part 2 in the rearward, leftward, and rightward directions by controlling the respective rotation of the right motor 5 and the left motor 7. In Embodiment 2, because the right motor 5 and the left motor 7 are provided so as not to be aligned along the same axis, it is possible to increase the degree of freedom in placement of the right motor 5 and the left motor 7 in the head part structure 1.

Embodiment 3

The following description will discuss another embodiment of the present invention. For convenience of explanation, the same reference numerals are given to members having functions identical with those described in the above embodiments, and descriptions of such members are omitted.

In Embodiment 3, the right motor 5 and the left motor 7 are provided in a manner so as not to be symmetrical with respect to a plane which (i) is orthogonal to the pitch axis 12 and (ii) includes both the roll axis 11 and the yaw axis 13. Even with such a configuration, the robot 100 is able to achieve tilting of the head part 2 in the forward, rearward, leftward, and rightward directions by controlling the respective rotation of the right motor 5 and the left motor 7. In Embodiment 3, because the right motor 5 and the left motor 7 are provided in a manner that is not symmetrical, it is possible to increase the degree of freedom in placement of the right motor 5 and the left motor 7 in the head part structure 1.

Embodiment 4

The following description will discuss another embodiment of the present invention. For convenience of explanation, the same reference numerals are given to members having functions identical with those described in the above embodiments, and descriptions of such members are omitted.

In Embodiment 4, the surface of the sliding region 31 which makes contact with the right link 6 is not flat. For example, the surface on which the right link 6 slides is a curved surface which has a spherical or bowl-like shape and which covers upper and lower portions of the tip 61 of the right link 6. This configuration allows the right link 6 to slide without problem in the sliding region 31.

In Embodiment 4, the surface of the sliding region 32 which makes contact with the left link 8 is not flat. For example, the surface on which the left link 8 slides is a curved surface which has a spherical or bowl-like shape and which covers upper and lower portions of the tip 81 of the left link 8. This configuration allows the left link 8 to slide favorably in the sliding region 31.

Recap

A movable structure (head part structure 1) for a device (robot 100) in accordance with Aspect 1 of the present invention includes: a movable part (head part 2); a connecting part (3) which has a first region (sliding region 31) and a second region (sliding region 32) and is connected to a housing (trunk 4); a first motor (right motor 5) which is fixed to the movable part and has a first rotary shaft (rotary shaft 51); a second motor (left motor 7) which is fixed to the movable part and has a second rotary shaft (rotary shaft 71); a first link (right link 6) which has a first tip (tip 61) and is fixed to the first rotary shaft, the first tip being in contact with the connecting part in a manner so as to be able to slide in the first region, a portion of the first tip which can make contact with the connecting part having a spherical shape; and a second link (left link 8) which has a second tip (tip 81) and is fixed to the second rotary shaft, the second tip being in contact with the connecting part in a manner so as to be able to slide in the second region, a portion of the second tip which can make contact with the second region having a spherical shape.

The above configuration makes it possible for a device to rotate a movable part of the device in a frontward rotation direction (92) or a rearward rotation direction (91) by rotating shafts of a first motor and a second motor in the same rotation direction. Furthermore, it is possible for the device to rotate the movable part in a rightward rotation direction (111) or a leftward rotation direction (112) by rotating the shafts of the first motor and the second motor in differing directions.

With such a device, rotating the movable part in any of two differing axial directions does not require twisting a right link and a left link. It is therefore possible to decrease the total lengths of both the right link and the left link. As a result, it is possible to achieve a reduction in the size of a movable structure which includes the right link and the left link.

In Aspect 2 of the present invention, the movable structure of Aspect 1 is configured such that the first rotary shaft and the second rotary shaft are provided so as to be aligned along the same axis.

The above configuration makes it possible to save space inside the movable structure.

In Aspect 3 of the present invention, the movable structure of Aspect 2 is configured such that the first motor and the second motor are provided in a manner so as to be symmetrical with respect to a plane that (i) is orthogonal to a pitch axis (12) of the movable structure and (ii) includes a roll axis (11) of the movable structure and a yaw axis (13) of the movable structure.

The above configuration makes it possible to for the device to rotate the movable part in any of two axial directions to a degree which corresponds to the rotation of the first motor and the second motor.

In Aspect 4 of the present invention, the movable structure of any one of Aspects 1 to 3 is configured such that: the first region covers upper and lower portions of the first tip; and the second region covers upper and lower portions of the second tip.

With the above configuration, motive power is efficiently transmitted to a connecting part when the right link and the left link slide.

In Aspect 5 of the present invention, the movable structure of any one of Aspects 1 to 4 is configured such that: a surface of the first region which makes contact with the first tip is flat; and a surface of the second region which makes contact with the second tip is flat.

The above configuration enables the first tip to slide smoothly in the first region and enables the second tip to slide smoothly in the second region.

A device in accordance with Aspect 6 of the present invention includes a movable structure in accordance with any one of Aspects 1 to 5.

The above configuration makes it possible to realize a device including a movable structure which is reduced in size.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

The head part structure 1 is merely one example of a movable structure in accordance with the present invention. The scope of the present invention includes (i) a variety of movable structures (for example, an arm part structure, a leg part structure, and a hip part structure) which have a movable part other than a head part (for example, an arm part, a leg part, or a hip part) that is rotated in any of two differing axial directions with use of the methods described above, and (ii) a robot including any of such movable structures.

The robot 100 is merely one example of a device in accordance with the present invention. The scope of the present invention includes (i) a movable structure including a movable part that is rotated in any of two differing axial directions with use of the methods described above and (ii) a device other than a robot (for example, an electrical appliance device) which includes such a movable structure.

REFERENCE SIGNS LIST

1 Head part structure (movable structure)
2 Head part (movable part)
3 Connecting part
4 Trunk (housing)
5 Right motor (first motor)
6 Right link (first link)
7 Left motor (first motor)
8 Left link (second link)
11 Roll axis
12 Pitch axis
13 Yaw axis
31 Sliding region (first region)
32 Sliding region (second region)
51 Rotary shaft (first rotary shaft)
71 Rotary shaft (second rotary shaft)
61 Tip (first tip)
81 Tip (second tip)
91 Rearward rotation direction
92 Frontward rotation direction
100 Robot (device)
101 Frontward direction
102 Rearward direction
111 Rightward rotation direction
112 Leftward rotation direction

The invention claimed is:

1. A movable structure for a device, the movable structure comprising: a movable part;
   a connecting part which has a first region and a second region and is connected to a housing;
   a first motor which is fixed to the movable part and has a first rotary shaft;
   a second motor which is fixed to the movable part and has a second rotary shaft;
   a first link which has a first tip and is fixed to the first rotary shaft, the first tip being in contact with the connecting part in a manner so as to be able to slide in the first region, a portion of the first tip which can make contact with the first region having a spherical shape; and
   a second link which has a second tip and is fixed to the second rotary shaft, the second tip being in contact with the connecting part in a manner so as to be able to slide in the second region, a portion of the second tip which can make contact with the second region having a spherical shape.

2. The movable structure according to claim 1, wherein the first rotary shaft and the second rotary shaft are provided so as to be aligned along the same axis.

3. The movable structure according to claim 2, wherein the first motor and the second motor are provided in a manner so as to be symmetrical with respect to a plane that (i) is orthogonal to a pitch axis of the movable structure and (ii) includes a roll axis of the movable structure and a yaw axis of the movable structure.

4. The movable structure according to claim 1, wherein:
   the first region covers upper and lower portions of the first tip; and
   the second region covers upper and lower portions of the second tip.

5. The movable structure according to claim 1, wherein:
   a surface of the first region which makes contact with the first tip is flat; and
   a surface of the second region which makes contact with the second tip is flat.

6. A device comprising a movable structure recited in claim 1.

* * * * *